United States Patent [19]

Walker et al.

[11] 4,141,840

[45] Feb. 27, 1979

[54] DRILLING FLUIDS CONTAINING POLYETHOXYLATED, SULFURIZED FATTY ALCOHOLS

[75] Inventors: Thad O. Walker, Humble, Tex.; Kenneth W. Warren, Tulsa, Okla.

[73] Assignee: Texaco Inc., New York, N.Y.

[21] Appl. No.: 852,390

[22] Filed: Nov. 17, 1977

Related U.S. Application Data

[63] Continuation-in-part of Ser. No. 698,435, Jun. 21, 1976, abandoned.

[51] Int. Cl.² .................................................. C09K 7/02
[52] U.S. Cl. ................................. 252/8.5 C; 252/49.3
[58] Field of Search ................ 252/8.5 C, 8.5 P, 48.2, 252/49.3; 175/65

[56] References Cited

U.S. PATENT DOCUMENTS

| | | | |
|---|---|---|---|
| 3,014,862 | 12/1961 | Tailleur | 252/8.5 C |
| 3,027,324 | 3/1912 | Rosenberg | 252/8.5 C |
| 3,761,410 | 9/1973 | Mondshine et al. | 252/8.5 C |
| 3,822,299 | 7/1974 | Lukeman et al. | 252/48.6 |

*Primary Examiner*—Herbert B. Guynn
*Attorney, Agent, or Firm*—Thomas H. Whaley; Carl G. Ries; James F. Young

[57] ABSTRACT

Aqueous drilling fluids containing polyethoxylated sulfurized fatty alcohols. Such fluids are especially useful where reduced torque drilling fluids are needed. Another embodiment of this invention relates to a method of drilling utilizing the above-described fluids.

6 Claims, No Drawings

DRILLING FLUIDS CONTAINING POLYETHOXYLATED, SULFURIZED FATTY ALCOHOLS

This application is a continuation in part application of application Ser. No. 698,435 filed June 21, 1976, now abandoned.

This invention relates to aqueous drilling fluids. More particularly, this invention relates to aqueous drilling fluids having incorporated therein a minor amount of a polyethoxylated sulfurized fatty alcohol as hereinafter more fully described. In another embodiment this invention is directed to an improved drilling operation employing the modified drilling fluids described above.

In a drilling operation, such as in a rotary drilling operation, a drilling fluid is forced down the drill string, about the drill bit at the bottom of the borehole and then back up to the surface. The drilling fluid employed in such a drilling operation usually is an aqueous drilling fluid and is compounded of various materials in order to impart certain desirable physical and chemical properties to the drilling fluid. For example, there is usually incorporated in an aqueous drilling fluid a hydratable clayey material, such as a bentonite clay, to impart desirable viscosity and gel strength properties to the drilling fluid so as to better enable the drilling fluid to carry away the drilling cuttings from the bottom of the borehole. Other materials such as weighting agents, e.g., barium sulfate, are employed to increase the density of the drilling fluid so as to make the drilling operation more effective and safer by overcoming the fluid pressure within the formation being drilled. Other materials such as water loss improving agents, e.g., carboxymethlcellulose, hydrolyzed starch, etc. are added to reduce the loss of fluid from the drilling fluid into the formation during the drilling operation. Still other materials such as corrosion inhibitors, bactericides and drill bit lubricants are incorporated in the drilling fluid in order to improve the drilling operation and the drilling fluid.

Although a wide variety of aqueous drilling fluids containing materials designed to increase the lubricity and these fluids have been proposed and used in the field, all of these modified drilling fluids suffer from one or more disadvantages.

In accordance with this invention an improved aqueous drilling fluid is provided by incorporating therein a minor amount of a water soluble or water dispersible polyethoxylated sulfurized fatty alcohol as hereinafter defined.

As used in the specification and in the accompanying claims, the expression "water soluble polyethoxylated sulfurized fatty alcohol" refers to an unsaturated fatty alcohol containing from about 14 to about 18 carbon atoms therein such as the various tetradecenols, hexadecenols, and octadecenols, including myristoleyl, palmitoleyl, oleyl, elaidyl, isooleyl, linoleyl, linolenyl, elaestearyl, ricinoleyl and the like, also containing from about 15 to about 30 moles of ethylene oxide therein per mole of said alcohol, and further containing from about 3 to about 6% of sulfur, based on the weight of the unsulfurized, polyethoxylated unsaturated fatty alcohol moiety. The preferred polyethoxylated, sulfurized unsaturated fatty alcohols are those containing from 16 to 18 carbon atoms, wherein the number of ethoxy groups are from 20 to 25 and wherein the sulfur content is from about 4 to 6% by weight.

A drilling fluid of this invention may be prepared by the addition of a minor amount of a water soluble polyethoxylated sulfurized fatty alcohol described above to an aqueous drilling fluid or to an aqueous drilling fluid containing a clay dispersed therein.

Polyethoxylated, unsaturated fatty alcohol precursors of the water soluble polyethoxylated, sulfurized fatty alcohols of the present invention are available commercially from Drew Chemical Corporation, New York under the trade designations Lipal 20-0A and 25-OA, respectively. Sulfurization of these water soluble polyethoxylated fatty alcohol precursors can be achieved by heating the polyethoxylated fatty alcohol to a temperature in the range of from about 150°–200° C. and adding thereto slowly the requisite amount of elemental sulfur while maintaining the resulting heated admixture at the prescribed temperature for approximately two hours, followed by a cooling period to let the sulfurized product reach room temperature. This product was used.

The amount of the water soluble polyethoxylated sulfurized fatty alcohol additives of the present invention added to the aqueous drilling fluid is a minor but sufficient amount to increase the lubricity of the said drilling fluid as measured, for example, by torque reduction while at the same time not impairing the rheology of the drilling fluid. The amount to be added to the well drilling fluid is in the range of from about 0.5 to about 5 pounds thereof, per barrel of drilling fluid, preferably from about 1 to about 3 pounds per barrel.

It has been found that the drilling fluids containing the novel additives of the present invention exhibit a high degree of lubricity with little or no abnormal distortion of mud properties. Moreover the drilling fluids do not generate an abnormal amount of foam, so that any foaming can be controlled by the use of conventional defoamers which are compatible with drilling fluid systems. The drilling fluids containing the novel additives of this invention show tolerance and stability over wide range in pH and electrolyte concentrations and they perform satisfactorily in the various mud systems (i.e. drilling fluid systems) in general use today, e.g. low and high pH, salt water, also nondispersed and inhibitive mud systems.

An aqueous drilling fluid was used as the Base Mud in the following Table A. This mud was a top-hole mud from the West Cote Blanche Bay Field, St. Mary Parish, Louisiana, which was treated with 6 lbs/bbl. of the ferrochrome lignosulfonate dispersant "Q-Broxin", its pH raised to 9.5 with caustic soda, and aged overnight at 150° F. before use.

There was added thereto varying amounts of the water soluble polyethoxylated sulfurized fatty alcohols. The physical properties of the resultant drilling fluids in terms of lubricity and drilling fluid rheology were measured using the lubricity tester described hereinbelow.

TEST PROCEDURE

A machine was designed to simulate borehole conditions. The torque on a steel shaft rotating in a formation type core in the presence of a circulating drilling fluid was measured.

The torque produced by dry friction is considered to be linearly dependent on the normal force independent of velocity, area, and fluid properties such as plastic viscosity and yield point.

Viscous friction is caused by viscous drag of the shaft rotating in the circulating mud system. This type drag is proportional to the surface area; and depends upon velocity, and film thickness which together can be considered as the velocity gradient; fluid properties such as plastic viscosity; and yield point. Viscous drag is dependent on the normal force only in an indirect manner through its effect on the film thickness. That is, increasing the normal force decreases the film thickness which in turn increases the velocity gradient thus increasing the required torque.

The major components of the test machine consist of a steel shaft turned by a cradle mounted motor with a Zero-Max (0 -800 rpm) speed control, and a swivel mounted core. The motor was arranged so torque readings could be taken on a spring scale attached to the end of a lever arm.

The core is mounted on a bracket which pivots about a stationary point on one end. A cable is attached to the other end of the bracket. This cable runs over a pulley and weights are hung on the end. From a balance of moments and forces, the load on the pulley or applied load can be related to the load on the shaft or the normal force holding the shaft and core in contact.

The torque-load relation for this laboratory machine is linear. Thus the dry friction model adequately describes the process under consideration, and the change of the coefficient of friction between the base mud and the treatment mud runs gives an indication of the effectiveness of the additive under consideration.

The results obtained are reported as % Reduction in Torque.

the polyethylene oxide content of the fatty alcohol. Using the 4 and 6% sulfurized with 20 and 25 moles of ethylene oxide and the oleyl alcohol moiety, results in satisfactory reductions in lubricity values coupled with good drilling fluid rheology properties (Examples 11, 12, 15 and 16). The data for Example 14 are considered unreliable since the other examples containing 2% sulfur were unsatisfactory.

The novel additives of the present invention have been found equally effective in brine drilling fluid systems containing as much as 200,000 ppm sodium chloride.

We claim:

1. An aqueous drilling fluid consisting essentially of an aqueous phase containing clay solids dispersed therein by a ferrochrome lignosulfonate dispersant and containing a water soluble polyethoxylated sulfurized unsaturated fatty alcohol containing from about 16 to about 18 carbon atoms therein and wherein the number of ethylene oxide groups therein is on an average of from about 20 to about 25 and wherein the sulfur content is from about 4 to about 6% by weight, basis ethoxylated fatty alcohol moiety, said fatty alcohol being present in said drilling fluid in an amount of from about 0.5 to about 5 pounds per barrel and being effective to improve the lubricity of said drilling fluid without impairing its drilling fluid properties.

2. An aqueous drilling fluid as claimed in claim 1 wherein said polyethoxylated sulfurized fatty alcohol is present in said aqueous phase in an amount of from

TABLE

| Example | Concentration (lbs/bbl) | Additive | Moles of Ethylene Oxide in Additive | % S | Reduction In Torque | Drilling Fluid Rheology P.V. | Y.P. | pH |
|---|---|---|---|---|---|---|---|---|
| Base Mud* | — | — | — | — | — | 23.5 | 0.5 | 9.4 |
| 1. | 1 | Lipal** | 5 | — | 13.3 | | | |
| 2. | 1 | " | " | 2 | 18.2 | | | |
| 3. | 1 | " | " | 4 | 19.1 | | | |
| 4. | 1 | " | " | 6 | 17.9 | | | |
| 5. | 1 | " | 10 | — | 16.8 | | | |
| 6. | " | " | " | 2 | 15.0 | | | |
| 7. | " | " | " | 4 | 28.3 | 20.5 | 16.5 | 9.5 |
| 8. | " | " | " | 6 | 16.5 | 27.5 | 27 | 9.5 |
| 9. | 1 | " | 20 | — | 20.4 | | | |
| 10. | " | " | " | 2 | 18.5 | | | |
| 11. | " | " | " | 4 | 28.4 | 31.5 | 16 | 9.5 |
| 12. | " | " | " | 6 | 21.2 | 23.5 | 5 | 9.5 |
| 13. | 1 | " | 25 | — | 23.0 | | | |
| 14. | " | " | " | 2 | 22.0 | | | |
| 15. | " | " | " | 4 | 31.5 | 18.5 | 8 | 9.5 |
| 16. | " | " | " | 6 | 20.0 | 19 | 9 | 9.4 |
| 17. | 1 | " | 50 | — | 11.8 | | | |
| 18. | " | " | " | 2 | 11.6 | | | |
| 19. | " | " | " | 4 | 19.7 | | | |
| 20. | " | " | " | 6 | 13.0 | | | |

Base Mud* - A water based field drilling fluid as described above
Lipal** - Unsaturated oleyl alcohol containing varying amounts of ethylene oxide, e.g. 5, 10, 20 25 or 50 moles.

The data presented in the Table above show that in general polyethoxylated fatty alcohols alone (Examples 1, 5, 9, 13 and 17) are not outstandingly effective as lubricity additives since there is less than a 20% reduction in torque obtained therewith except for Example 13 and there the 23% reduction is most likely due to the increased hydrophilic nature of the ethoxylated part of the fatty alcohol.

The data for the 2-6% sulfurized ethoxylated (5mole, 10, and 50 mole) fatty alcohols (Examples 2-4, 6, 8, 10, and 18-20) likewise fall in this category except for the 28% value of Example 7, and here the rheology of the drilling fluid containing same has been substantially impaired so that this species is likewise considered unsatisfactory. The data in the Table further show the criticality of the combination of the % sulfurization and about 1 to 3 pounds per barrel.

3. An aqueous drilling fluid as claimed in claim 1 wherein said polyethoxylated sulfurized fatty alcohol is oleyl alcohol.

4. In a method of drilling wells wherein a drilling fluid is circulated in the well in contact with an earth formation during the drilling operation, the improvement which comprises contacting said earth formation with an aqueous drilling fluid consisting essentially of an aqueous phase containing clay solids dispersed therein by a ferrochrome lignosulfonate dispersant and containing a water soluble polyethyoxylated sulfurized unsaturated fatty alcohol containing from about 16 to about 18 carbon atoms therein and wherein the number of ethylene oxide groups therein is on an average of from about 20 to about 25 and wherein the sulfur content is from about 4 to about 6%, by weight, basis ethoxylated fatty alcohol moiety, said fatty alcohol being present in an amount of from about 0.5 to about 5 pounds per barrel and being effective to improve the lubricity of said drilling fluid without impairing the drilling fluid properties.

5. A method as claimed in claim 4 wherein said polyethoxylated sulfurized fatty alcohol is present in said aqueous phase in an amount of from about 1 to 3 pounds per barrel.

6. A method as claimed in claim 4 wherein said fatty alcohol is oleyl alcohol.

* * * * *